United States Patent [19]
Ball et al.

[11] Patent Number: 5,408,510
[45] Date of Patent: Apr. 18, 1995

[54] THERMIONIC NUCLEAR REACTOR WITH FLUX SHIELDED COMPONENTS

[75] Inventors: Russell M. Ball, Lynchburg; John J. Madaras, Forest, both of Va.

[73] Assignee: The Babcock & Wilcox Company, New Orleans, La.

[21] Appl. No.: 226,152

[22] Filed: Apr. 11, 1994

[51] Int. Cl.⁶ .............................................. G21C 3/40
[52] U.S. Cl. ................................... 376/321; 376/367; 376/425; 376/455
[58] Field of Search ............... 376/321, 455, 320, 367, 376/425

[56] References Cited

U.S. PATENT DOCUMENTS

| | | | |
|---|---|---|---|
| 3,286,107 | 11/1966 | Fein et al. | 376/321 |
| 3,387,148 | 6/1968 | Janner et al. | 376/321 |
| 3,601,638 | 8/1971 | Busse | 376/321 |
| 4,008,407 | 2/1977 | Fletcher | 376/321 |
| 4,040,903 | 8/1977 | Monroe, Jr. | 376/321 |
| 4,085,004 | 4/1978 | Fletcher | 376/321 |
| 4,755,350 | 7/1988 | Kennel | 376/321 |

*Primary Examiner*—Behrend E. Harvey
*Attorney, Agent, or Firm*—Robert J. Edwards; D. Neil LaHaye

[57] ABSTRACT

A hydrogenous moderated thermionic nuclear reactor operating in the thermal neutron energy region. Thermionic fuel elements are formed from multiple concentric cylinders. The center cylinder is a combination heat pipe and thermionic converter collector. The second cylinder is the converter emitter. The third cylinder is the nuclear fuel. The outer cylinder is the physical barrier between the fuel element and moderator. Between the outer radius of the fuel and outer cylinder is a gap containing multi-foil insulation. The insulation acts as a thermal barrier between the fuel and the outer cylinder and accommodates fuel expansion. This also causes heat flow to be radially inward from the fuel to the center converter/heat pipe.

6 Claims, 1 Drawing Sheet

THERMIONIC NUCLEAR REACTOR WITH FLUX SHIELDED COMPONENTS

BACKGROUND OF THE INVENTION

1. Field of the Invention

The invention is generally related to nuclear reactors and more particularly to thermionic reactors.

2. General Background

Thermionic reactors use thermionic conversion devices for the direct conversion of heat to electricity. Thermionic converters operate in the following general manner. Heating of an element, such as the cathode, serves to dislodge electrons from the lattice structure of the cathode material by increasing their kinetic energy. These electrons flow to another element, such as the anode, which is maintained at a lower temperature. By connecting the two electrodes to a load, an electrical current is established and current flows which operates an electrically powered device. The use of thermionic devices in combination with nuclear reactors is particularly advantageous for reactors designed for use in outer space due to the potential for mass reduction while maintaining equal power output.

Thermionic reactor design has been concentrated on two different approaches, excore thermionic concepts and thermionic fuel elements. Excore thermionic reactors typically utilize a cylindrical reactor core having a high conductivity nuclear fuel. $UC_2$ in graphite is usually used as the fuel. The thermionic devices are located exterior of the core. Thermal heat transfer from the nuclear fuel causes thermionic diodes to generate electrical power. Nuclear fuel swells at the high temperatures required for efficient thermionic diode operation. Isolating the diodes from the fuel prevents the dimensional changes of the fuel from affecting the precise tolerances needed for efficient thermionic diode operation. The excore systems require the use of less developed fuels such as $UC_2$ to prevent excessive fuel temperatures because the heat must be conducted from the core before reaching the thermionic diodes outside the core. Even with a fuel having a high heat conductivity, this type of reactor is limited to relatively low power levels to maintain acceptable fuel temperatures. The second type of thermionic reactor utilizes thermionic fuel elements (TFE's). The TFE is a cylindrical thermionic diode with nuclear fuel in the center of the diode. The fuel cladding becomes the emitter and must be designed to accommodate fuel swelling and chemical attack by the numerous chemical species generated during the fission process. This concept can use a more developed fuel such as $UO_2$ because the heat conductive path from the center of the fuel pellet to the thermionic diode is short. This concept can also be scaled to larger power levels because the TFE becomes a modular fuel element. However, accommodation of fuel swelling while maintaining the precise tolerances required for efficient thermionic diode operation present significant development problems for this design.

A variation of the excore design utilizes an annular core with thermionic diodes around the outside and the inside of the annulus. This variation uses a thermionic heat pipe module (THPM). The THPM incorporates a cylindrical thermionic diode similar to the TFE but with a central heat pipe for heat rejection. The device provides both power conversion and waste heat removal in a single module. This configuration provides an advantage over other excore concepts because it uses $UO_2$ instead of carbide fuel but still presents many of the other disadvantages associated with excore concepts because of its limited size potential and its high fuel temperatures.

U.S. Pat. No. 4,755,350 is directed mainly to the use of a heat sink in the center of the thermionic converter to absorb energy created by the nuclear fuel external to the converter. The central heat sink is a neutron moderator so that neutrons are moderated inside the converter.

U.S. Pat. No. 5,219,516 discloses the use of a heat pipe on the outside of the thermionic emitter with the goal of better heat distribution to the emitter surface and maintaining a more uniform temperature.

U.S. Pat. No. 5,247,548 discloses a thermionic reactor that provides electrical and propulsion power. A plurality of thermionic heat pipe modules are spaced apart in the reactor on a hexagonal pitch. Nuclear fuel elements are positioned in the spaces between the thermionic heat pipe modules.

U.S. Pat. Nos. 3,548,222; 3,558,935; 3,563,856; and 4,040,903 disclose thermionic fuel elements where the fuel is at the center of the converter.

Much of the known art uses a central nuclear fuel component as the heat source where the thermal energy is radiated or conducted radially outward to the emitter of a thermionic converter where the conversion to electrical energy takes place. Waste thermal energy is then radiated or conducted radially outward to a heat transport system connected to an ultimate heat sink. This design typically encounters two major drawbacks. First, the phenomenon of nuclear fuel swelling at high temperatures and long exposure of operation of these devices causes the center fuel to expand outward. As the fuel expands outward, it forces the emitter of the thermionic converter to increase its radius, thereby coming into contact with the collector and creating an electrical short. To accommodate this swelling, these designs typically increase the gap between the converter emitter and collector to avoid electrical shorting. This gap increase results in reduced efficiency of electrical conversion. Second, because the emitter is located adjacent the high neutron flux field of the fuel, emitter material choices can have a deleterious effect on the flux level causing the fission process. Therefore, a design trade-off is made that results in a less efficient overall system. The known art thus leaves a need for a compact and more efficient thermionic nuclear reactor generator.

SUMMARY OF THE INVENTION

The invention addresses the above need. What is provided is a hydrogenous moderated thermionic nuclear reactor that utilizes thermionic fuel elements formed from multiple concentric cylinders. The center cylinder is a combination heat pipe and thermionic converter collector. The second cylinder is the converter emitter. The third cylinder is the nuclear fuel. The outer cylinder is the physical and thermal barrier between the fuel element and moderator. Between the outer radius of the fuel and outer cylinder is a gap containing multi-foil insulation. The insulation acts as a thermal barrier between the fuel and the outer cylinder and accommodates fuel expansion. This also causes heat flow to be from the fuel to the center converter/heat pipe.

BRIEF DESCRIPTION OF THE DRAWINGS

For a further understanding of the nature and objects of the present invention reference should be had to the following description, taken in conjunction with the accompanying drawings in which like parts are given like reference numerals, and wherein.

DETAILED DESCRIPTION OF THE PREFERRED EMBODIMENT

Figure 1:
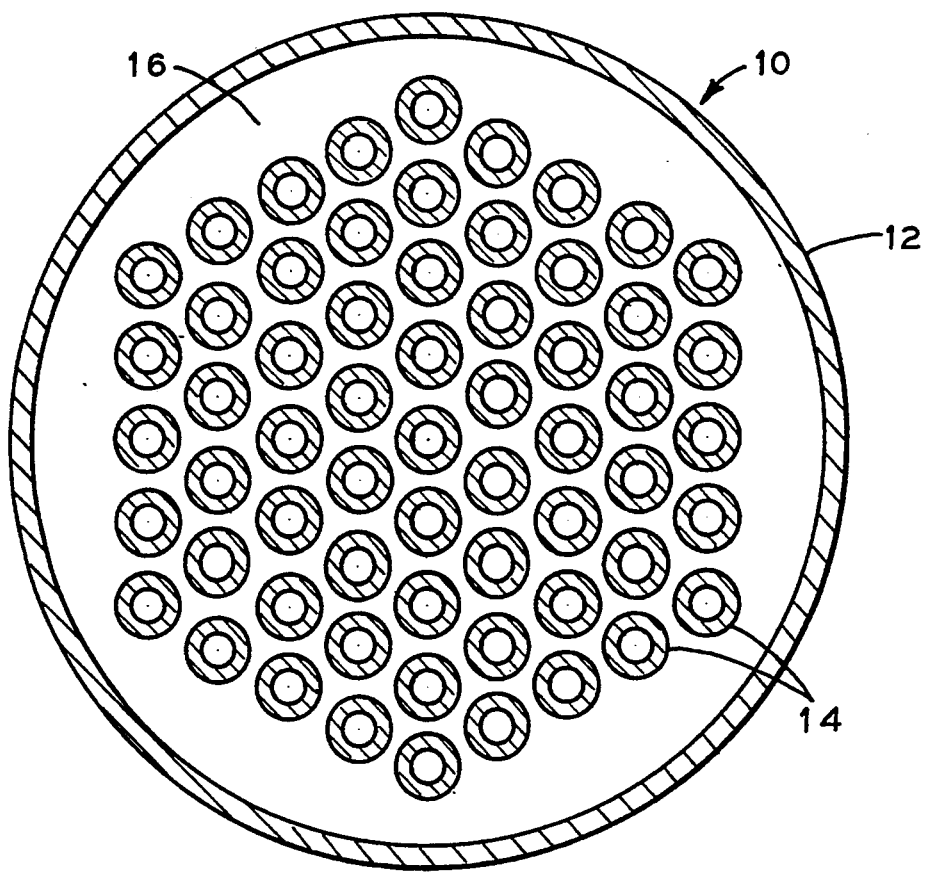
FIG. 1 is a radial schematic sectional view of the nuclear reactor core of the invention.
Figure 2:
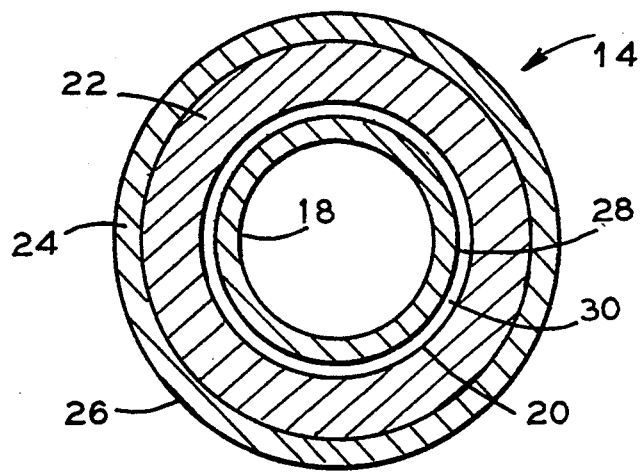
FIG. 2 is a radial sectional view of a thermionic fuel element of the invention.

Referring to the drawings, it is seen in FIG. 1 that the invention is generally indicated by the numeral 10. Thermionic nuclear reactor 10 is generally comprised of reactor vessel 12 and a plurality of thermionic nuclear fuel elements 14.

Reactor vessel 12 is of any suitable type and encloses a hydrogenous moderator 16. A light water moderator is used in the preferred embodiment but other efficient neutron moderators may be used.

Each thermionic nuclear fuel element 14 is formed from a series of concentric cylinders that comprise combined heat pipe and collector 18, converter emitter 20, nuclear fuel ring 22, insulation 24, and cylinder 26.

Combined heat pipe and collector 18 has the collector 28 positioned on the outer diameter of the pipe. In the preferred embodiment, collector 28 is approximately 2.0 mm thick. The cold end of the heat pipe is connected to the ultimate heat sink or can be connected to an intermediate cooling system. Annular gap 30 is defined between collector 28 and converter emitter 20. Gap 30 is preferably 0.25 mm and is filled with cesium vapor which promotes the flow of electrons from the emitter 20 to the collector 28. Emitter 20 is positioned around and concentric with heat pipe and collector 18. Emitter 20, preferably 2.0 mm thick, is preferably formed from tungsten or another suitable material that may be used as an emitter. Emitter 20 is in physical contact with the inner radius of nuclear fuel ring 22. The compressive load of nuclear fuel ring 22 on emitter 20 allows for a more consistent gap 30 than if emitter 20 would be under tension and reduces the risk of failure. Nuclear fuel ring 22 is positioned around and concentric with emitter 20 and is preferably formed from enriched $UO_2$ or other chemical forms of fissionable material suitable to the application. In the preferred embodiment, nuclear fuel ring 22 measures 10 mm between its inner and outer diameters. Insulation 24 is positioned in the gap between fuel ring 22 and cylinder 26 so as to be concentric with fuel ring 22 and is preferably a compressible multi-foil insulation that forms a thermal barrier between the fuel and cylinder 26 and accommodates thermal expansion of fuel ring 22. Cylinder 26 is a closed-end cylinder positioned around and concentric with insulation 24 that acts as a physical boundary to prevent contact between the internal components of thermionic nuclear fuel element 14 and moderator 16. Cylinder 26 is preferably formed from metal suitable to the application that is 1.0 mm thick.

In operation, the nuclear fission reaction takes place within the fissionable fuel, releasing thermal energy within the fuel. This takes place in a non uniform fashion within the fuel ring 22, with most of the power being generated in the outer region of the fuel, decreasing toward the inner fuel radius. This is a result of the moderator being external to each individual fuel element such that the fission rate is high in the outer fuel region near the moderator and low in the inner fuel region near the emitter of the thermionic converter. The heat energy is conducted radially inward due to the thermal barrier created by the multi-foil insulation 24. The location of the collector and emitter electrodes at the inner part of the element permits a large amount of free volume in the fuel and moderator space. This can be used to either hold or vent fission gases. The thermionic converter generates an electrical potential between the emitter 20 and collector 28. Waste heat is carried away by heat pipe 18. The removal of waste heat via the heat pipe in the center of the thermionic nuclear fuel element 14 and the thermal barrier between the fuel and moderator permits the use of low temperature hydrogenous moderators such as water, zirconium hydride, or polyethylene. While emitter 20 requires the use of tungsten or other materials having properties that are conducive to efficient thermionic conversion, such materials have a high neutron absorption cross section. However, in the embodiment of the invention, the negative effect of these materials on the fission process is negligible due to the location of the emitter 20 in a region of relatively low neutron flux. This allows the advantage of the use of materials that are generally better suited for use in thermionic converters and that result in higher conversion efficiencies. The thermionic nuclear fuel element 14 emitters and collectors are connected electrically in parallel and/or series to generate electrical power. The transfer of heat from the fuel to the emitter is by conduction which is more efficient than either radiative or convective heat transfer. This increased efficiency permits the fuel to operate at a lower temperature than other thermionic designs and permits the use of uranium dioxide as the fuel form. In the configuration of FIG. 1, with sixty-one thermionic nuclear fuel elements 14 each having an approximate length of eight hundred millimeters, it is calculated that approximately one hundred KWe would be generated at full reactor power. It should be understood that FIG. 1 is a schematic illustration to illustrate the preferred configuration of thermionic nuclear fuel elements 14 and that safety and control components known in the industry would also be included in the core or reflector of the reactor.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:
1. A thermionic nuclear reactor, comprising:
   a. a reactor vessel;
   b. a hydrogenous moderator provided in said reactor vessel; and
   c. a plurality of thermionic nuclear fuel elements located inside said reactor vessel and spaced apart from each other, said thermionic nuclear fuel elements comprising:
      i. a combined heat pipe and collector;
      ii. a converter emitter positioned around the exterior of and concentric with said heat pipe and collector so as to define an annular gap therebetween;

iii. a nuclear fuel ring positioned around and concentric with said converter emitter;
iv. insulation material positioned around and concentric with said nuclear fuel ring; and
v. a closed-end cylinder positioned around and concentric with said insulation material.

2. The thermionic reactor of claim 1, wherein said nuclear fuel ring is formed from $UO_2$.

3. The thermionic reactor of claim 1, wherein said insulation material is formed from compressible multifoil material.

4. The thermionic reactor of claim 1, wherein said converter emitter is formed from tungsten.

5. A thermionic nuclear reactor, comprising:
a. a reactor vessel;
b. a hydrogenous moderator provided in said reactor vessel; and
c. a plurality of thermionic nuclear fuel elements located inside said reactor vessel and spaced apart from each other, said thermionic nuclear fuel elements comprising:
i. a combined heat pipe and collector;
ii. a converter emitter positioned around the exterior of and concentric with said heat pipe and collector so as to define an annular gap therebetween;
iii. a $UO_2$ nuclear fuel ring positioned around and concentric with said converter emitter;
iv. compressible insulation material positioned around and concentric with said nuclear fuel ring; and
v. a closed-end cylinder positioned around and concentric with said insulation material.

6. The thermionic reactor of claim 5, wherein said converter emitter is formed from tungsten.

* * * * *